US010759277B2

(12) United States Patent
Tanaka et al.

(10) Patent No.: US 10,759,277 B2
(45) Date of Patent: Sep. 1, 2020

(54) FOUR-WHEEL DRIVE VEHICLE CLUTCH CONTROL METHOD AND CLUTCH CONTROL DEVICE

(71) Applicant: Nissan Motor Co., Ltd., Yokohama-shi, Kanagawa (JP)

(72) Inventors: Koutarou Tanaka, Kanagawa (JP); Yuusuke Hirahata, Kanagawa (JP); Keishirou Nakamura, Kanagawa (JP); Kouki Saitou, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 16/490,920

(22) PCT Filed: Apr. 4, 2017

(86) PCT No.: PCT/JP2017/014051
§ 371 (c)(1),
(2) Date: Sep. 4, 2019

(87) PCT Pub. No.: WO2018/185827
PCT Pub. Date: Oct. 11, 2018

(65) Prior Publication Data
US 2020/0009962 A1    Jan. 9, 2020

(51) Int. Cl.
*B60W 10/119* (2012.01)
*B60K 23/08* (2006.01)
(Continued)

(52) U.S. Cl.
CPC ........... *B60K 23/08* (2013.01); *B60W 10/026* (2013.01); *B60W 10/119* (2013.01);
(Continued)

(58) Field of Classification Search
CPC ............... B60W 10/119; B60W 10/14; B60W 30/18027; B60W 30/18054;
(Continued)

(56) References Cited

U.S. PATENT DOCUMENTS

| 9,862,270 B2 | 1/2018 | Maeda | |
| 2011/0257858 A1* | 10/2011 | Kobayashi | ......... B60K 17/3462 701/69 |
| 2016/0193917 A1* | 7/2016 | Horiike | .................. B60K 17/35 701/54 |

FOREIGN PATENT DOCUMENTS

| CN | 106029428 A | 10/2016 |
| CN | 106103174 A | 11/2016 |

(Continued)

*Primary Examiner* — Edwin A Young
(74) *Attorney, Agent, or Firm* — Global IP Counselors, LLP

(57) ABSTRACT

A clutch control method is provided for a four-wheel-drive vehicle in which the main drive wheels are connected to a drive source, and the auxiliary drive wheels are connected via a friction clutch to the drive source. When the vehicle starts off due to an accelerator depressing operation, the friction clutch is engaged to distribute, a drive torque from the drive source to the main drive wheels and the auxiliary drive wheels. In this clutch control method, when the vehicle switches from a traveling state to a stopped state while maintaining in a travel shift position, a control is preformed to apply initial torque as an engagement torque control of the friction clutch while the vehicle is stopped. A magnitude of the initial torque is set to a magnitude that maintains a drive-system torsion state by transmitting torque to an auxiliary-drive-wheel drive system before the vehicle is stopped.

8 Claims, 11 Drawing Sheets

(51) Int. Cl.
    *B60W 10/02*     (2006.01)
    *B60W 30/18*     (2012.01)
(52) U.S. Cl.
    CPC   *B60W 30/18018* (2013.01); *B60W 30/18063* (2013.01); *B60K 2023/0891* (2013.01); *B60W 30/18054* (2013.01); *B60W 2300/18* (2013.01)
(58) Field of Classification Search
    CPC ......... B60W 30/18063; B60W 30/181; B60W 30/18118; B60W 2520/04; B60W 2710/027; F16H 2059/446
    See application file for complete search history.

(56)           References Cited

FOREIGN PATENT DOCUMENTS

| | | |
|---|---|---|
| CN | 106232411 A | 12/2016 |
| CN | 106414143 A | 2/2017 |
| EP | 3243683 A1 | 11/2017 |
| JP | S63-109222 U | 7/1988 |
| JP | H06-11217 Y2 | 3/1994 |
| JP | 2002-87094 A | 3/2002 |
| JP | 2003-170754 A | 6/2003 |
| JP | 2004-130858 A | 4/2004 |
| JP | 2005-83464 A | 3/2005 |
| JP | 2010-254135 A | 11/2010 |
| JP | 2017-7454 A | 1/2017 |
| WO | 2016/204090 A1 | 12/2016 |

\* cited by examiner

US 10,759,277 B2

FOUR-WHEEL DRIVE VEHICLE CLUTCH CONTROL METHOD AND CLUTCH CONTROL DEVICE

CROSS-REFERENCE TO RELATED APPLICATIONS

This application is a U.S. national stage application of International Application No. PCT/JP2017/014051, filed on Apr. 4, 2017.

BACKGROUND

Technical Field

The present disclosure relates to a clutch control method and a clutch control device for a four-wheel-drive vehicle in which a friction clutch is provided to a system for transmitting drive torque to auxiliary drive wheels.

Background Information

Four-wheel-drive vehicles having a front-wheel-drive base in which an electronic control coupling (as one example of a friction clutch) is provided to a system for transmitting drive torque to rear wheels have been known in the past (for example, see Japanese Laid-Open Patent Application No. 2010-254135 which is referred to herein after as Patent Document 1). In order to improve responsiveness of torque transmission to the rear wheels when such a four-wheel-drive vehicle starts off on an uphill slope, the electronic control coupling is disengaged when a positional correlation of two cam members lies along an opposite direction to a selected shift position.

SUMMARY

Patent Document 1 includes no specific disclosure as to a manner in which to apply initial torque, which is a clutch engagement torque occurring when a vehicle is stopped; there is room for consideration of methods therefor. Initial torque in a stopped state is applied with a zero torque or with a very low torque to disengage an electronic control coupling. At this time, when an accelerator depressing operation is performed in order to start off again from the stopped state while a travel shift position is maintained, torque from a drive source is transmitted only to the front wheels, which are the main drive wheels, and drive slippage occurs in the front wheels at the start of the accelerator depressing operation. Therefore, a problem is presented in that even if a 4WD instruction torque is outputted to the electronic control coupling at the same time as the accelerator depressing operation is performed, an increase in the engagement torque (torque transmitted to rear wheels) relative to the instruction torque is delayed and responsiveness of torque transmission to the rear wheels, which are the auxiliary drive wheels, decreases.

The present disclosure is directed at the above-described problem, it being an object of the present disclosure to ensure responsiveness of torque transmission to auxiliary drive wheels relative to an accelerator depressing operation when a vehicle starts off again from a stopped state.

In order to achieve the above object, the present disclosure provides either left and right front wheels or left and right rear wheels that are configured as main drive wheels connected to a drive source, and the other of the left and right front wheels and the left and right rear wheels are configured as auxiliary drive wheels connected via a friction clutch to the drive source. When the vehicle starts off due to an accelerator depressing operation, the friction clutch is engaged, whereby drive torque from the drive source is distributed to the main drive wheels and the auxiliary drive wheels. In this a four-wheel-drive vehicle clutch control method, when the vehicle changes over from a traveling state to a stopped state while maintaining in a travel shift position, a control is performed to apply initial torque as an engagement torque control of the friction clutch when the vehicle is stopped. A magnitude of the initial torque is set to a magnitude that is necessary for maintaining a drive-system torsion state by torque transmitted to an auxiliary-drive-wheel drive system before the vehicle is stopped.

Thus, by applying initial torque at a magnitude necessary for maintaining a drive-system torsion state before the vehicle is stopped in preparation for the vehicle setting off again when the vehicle is stopped, it is possible to ensure responsiveness of torque transmission to auxiliary drive wheels relative to an accelerator depressing operation when the vehicle starts off again from a stopped state.

DETAILED DESCRIPTION OF THE EMBODIMENTS

Figure 1:
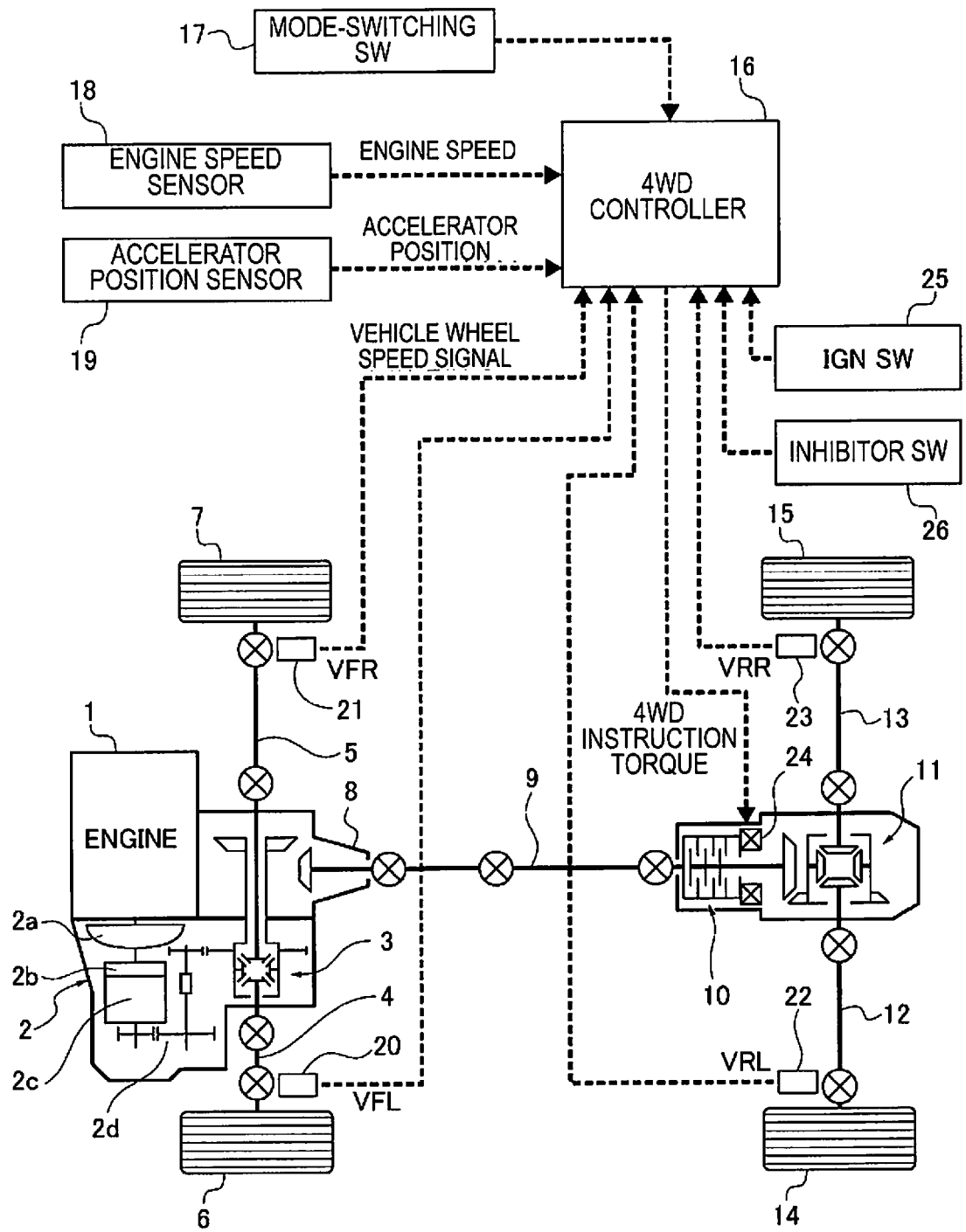
FIG. 1 is an overall system diagram showing a configuration of a drive system and a configuration of a 4WD control system in a four-wheel-drive engine-powered vehicle having a front-wheel-drive base to which a clutch control method and a clutch control device of the first embodiment are applied.

A preferred embodiment for realizing a method and a device for controlling a clutch of a four-wheel-drive vehicle of the present disclosure is described below on the basis of the first embodiment shown in the drawings.

First Embodiment

First, a configuration is described. The clutch control method and the clutch control device in the first embodiment are applied to a four-wheel-drive engine-powered vehicle having a front-wheel-drive base (said vehicle being one example of a four-wheel-drive vehicle). The configuration of the first embodiment is divided below into "a configuration of an overall system of the four-wheel-drive engine-powered vehicle," "a detailed configuration of an electronic control coupling," "a configuration of an automatic 4WD control," and "a configuration of an initial torque control process."
Configuration of Overall System of Four-Wheel-Drive Engine-Powered Vehicle FIG. 1 shows a configuration of a drive system and a configuration of a 4WD control system in a four-wheel-drive engine-powered vehicle having a front-wheel-drive base to which the clutch control method and the clutch control device of the first embodiment are applied. A configuration of the overall system of the four-wheel-drive engine-powered vehicle is described below on the basis of FIG. 1.

A front-wheel-drive system of the four-wheel-drive engine-powered vehicle is provided with a transverse engine 1 (drive source), an automatic transmission 2, a front differential 3, left and right front-wheel drive shafts 4, 5, and left and right front wheels 6, 7 (main drive wheels), as shown in FIG. 1.

The automatic transmission 2 is provided with a torque converter 2a, a forward/rearward-progress-switching mechanism 2b, a continuously variable transmission mechanism 2c, and a final reduction mechanism 2d.

A rear-wheel-drive system of the four-wheel-drive engine-powered vehicle is provided with a transfer 8, a propeller shaft 9, an electronic control coupling 10 (friction clutch), a rear differential 11, left and right rear-wheel drive shafts 12, 13, and left and right rear wheels 14, 15 (auxiliary drive wheels), as shown in FIG. 1.

The electronic control coupling 10 is a ball-cam-type friction clutch in which clutch engagement torque (4WD clutch torque) is generated, the clutch engagement torque corresponding to a solenoid command current produced from 4WD instruction torque outputted from a 4WD controller 16.

Specifically, a vehicle having a front-engine, front-wheel-drive (FF) layout is used as a base, the vehicle having an FF layout being such that drive torque that has passed through the transverse engine 1 and the automatic transmission 2 is transmitted to the left and right front wheels 6, 7, and some of the drive torque is transmitted to the left and right rear wheels 14, 15 via the electronic control coupling 10. In a state in which the electronic control coupling 10 is disengaged, a ratio (%) of torque distribution between the front and rear wheels in the four-wheel-drive engine-powered vehicle is a front-wheel-drive distribution ratio according to a front wheel/rear wheel distribution of 100%:0%. In a state in which the electronic control coupling 10 is completely engaged, this ratio is a front wheel/rear wheel equal distribution ratio according to a front wheel/rear wheel distribution of 50%:50%. A rear wheel distribution ratio is controlled continuously within a range of 0-50% in accordance with the engagement torque of the electronic control coupling 10.

The 4WD controller 16, which controls the engagement torque of the electronic control coupling 10, is provided as a 4WD control system for the four-wheel-drive engine-powered vehicle, as shown in FIG. 1. A mode-switching switch 17, an engine speed sensor 18, an accelerator position sensor 19, vehicle wheel speed sensors 20, 21, 22, 23, an ignition switch 25, an inhibitor switch 26, etc., are connected to the 4WD controller 16. As other types of sensors (not shown), a steering angle sensor, a yaw rate sensor, a lateral G sensor, and a longitudinal G sensor are connected to the 4WD controller 16. A turning state of the vehicle is determined on the basis of input information from the sensors, and the engagement torque of the electronic control coupling 10 is reduced and corrected in accordance with the turning state, whereby tight corner braking is suppressed.

The 4WD controller 16 computes a final 4WD instruction torque on the basis of the input information from the sensor and switches, and outputs the solenoid command current, which is obtained by converting the final 4WD instruction torque to a solenoid current, to a 4WD solenoid 24 of the electronic control coupling 10.

The mode-switching switch 17 switches to any drive mode from among a "2WD mode," a "locked mode," and an "auto mode" according to a selection operation performed by a driver. When the "2WD mode" is selected, a front-wheel-drive 2WD state is maintained according to complete disengagement of the electronic control coupling 10. When the "locked mode" is selected, a 4WD state in which a distribution of torque to the front and rear wheels is fixed at 50:50 is maintained by completely engaging the electronic control coupling 10. When the "auto mode" is selected, the engagement torque of the electronic control coupling 10 is automatically controlled in accordance with a state of the vehicle (vehicle speed VSP, accelerator position APO, etc.), and there is implemented an optimal torque distribution ratio that matches changes in a state of the vehicle and a condition of a road surface.

The engine speed sensor 18 detects an engine speed of the transverse engine 1 and outputs an engine speed signal to the 4WD controller 16.

The accelerator position sensor 19 detects an amount of accelerator depression produced by a driver operation as an accelerator position APO and outputs an accelerator position signal to the 4WD controller 16.

The vehicle wheel speed sensors (left front wheel speed sensor 20, right front wheel speed sensor 21, left rear wheel speed sensor 22, right rear wheel speed sensor 23) respectively detect vehicle wheel speeds of the left and right front wheels 6, 7 and the left and right rear wheels 14, 15 and output vehicle wheel speed signals to the 4WD controller 16. A configuration is adopted in which information about the vehicle speed VSP is acquired in accordance with an average value of the vehicle wheel speed of the left and right rear wheels 14, 15, which are the auxiliary drive wheels.

The inhibitor switch 26 detects a shift position (P position, R position, N position, or D position) selected by a shift lever operation and outputs a shift position signal to the 4WD controller 16.

Detailed Configuration of Electronically Controlled Coupling

Figure 2:
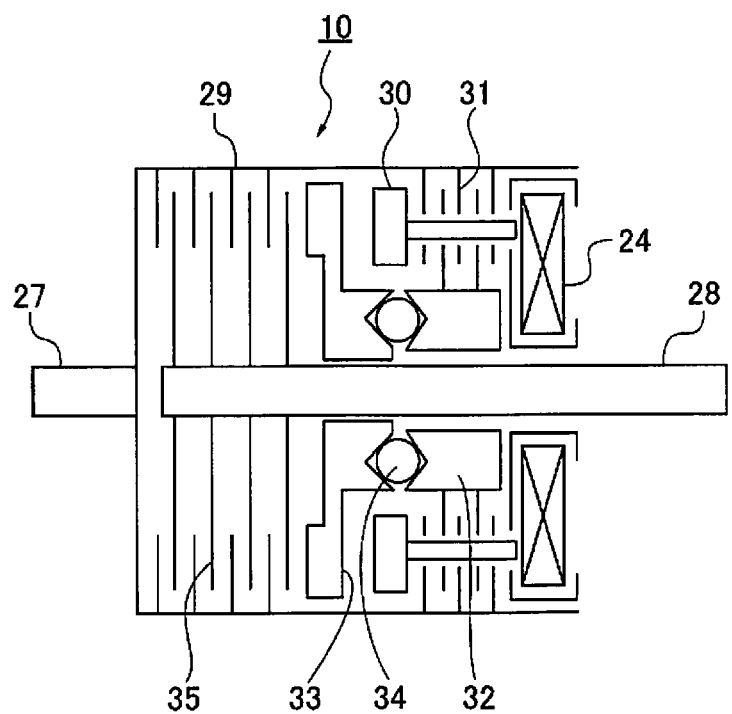
FIG. 2 is a cross-sectional view showing an electronically controlled ball-cam-type coupling provided to a rear drive wheel system of the four-wheel-drive engine-powered vehicle.
Figure 3:
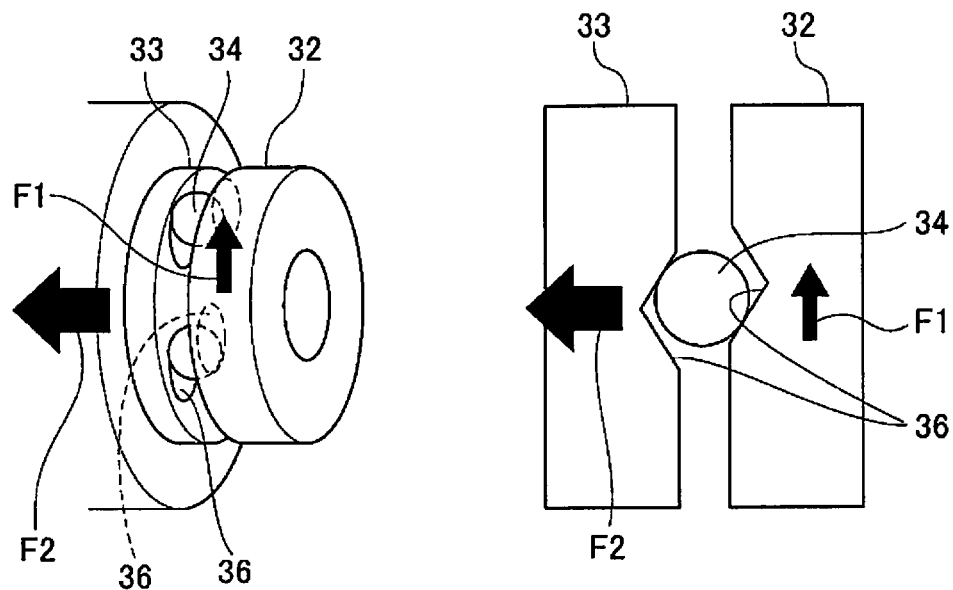
FIG. 3 is a perspective view and an action schematic view showing a cam mechanism in the electronically controlled ball-cam-type coupling.

FIGS. 2 and 3 show an electronically controlled ball-cam-type coupling and a cam mechanism provided to the rear-wheel-drive system of the four-wheel-drive engine-powered vehicle. A detailed configuration of the electronic control coupling 10 is described below on the basis of FIGS. 2 and 3.

The electronically controlled ball-cam-type coupling 10 is provided with a coupling input shaft 27, a coupling output shaft 28, and a coupling housing 29, as shown in FIG. 2.

One end of the coupling input shaft 27 is linked to the propeller shaft 9, and the other end of the coupling input shaft 27 is secured to the coupling housing 29. The coupling output shaft 28 is secured to an input gear of the rear differential 11.

The electronically controlled ball-cam-type coupling 10 has a control clutch 31 and a main clutch 35 inside the coupling housing 29. The control clutch 31 is a multi-plate friction clutch interposed between the coupling housing 29 and a control cam 32. The main clutch 35 is a multi-plate friction clutch interposed between the coupling housing 29 and the coupling output shaft 28.

The cam mechanism of the electronically controlled ball-cam-type coupling 10 is configured from a control-clutch 31-side control cam 32, a main-clutch 35-side main cam 33, and balls 34 sandwiched between cam grooves 36, 36 formed in the two cams 32, 33.

An action for engaging the electronically controlled ball-cam-type coupling 10 is described below on the basis of FIG. 3. First, when a coil current is made to flow to the 4WD solenoid 24 by the solenoid command current from the 4WD controller 16, a magnetic field is generated around the 4WD solenoid 24 and an armature 30 is caused to be drawn toward the control clutch 31. Friction torque is generated by the control clutch 31 upon being pressed by the armature 30 drawn thereto, and the friction torque generated by the control clutch 31 is transmitted to the control cam 32 of the cam mechanism to become a circumferential-direction binding force F1. The circumferential-direction binding force F1 applied to the control cam 32 is amplified and converted to an axial-direction clutch pressing force F2 via the cam grooves 36, 36 and the balls 34, and the main cam 33 is pressed frontward. Thus, due to the clutch pressing force F2 from the main cam 33 pressing and engaging the main clutch 35, clutch engagement torque that is proportional to the solenoid command current is generated in the main clutch 35. The clutch engagement torque generated in the main clutch 35 is transmitted to the rear differential 11 through the coupling output shaft 28.

Configuration of Automatic 4WD Control

Figure 4:
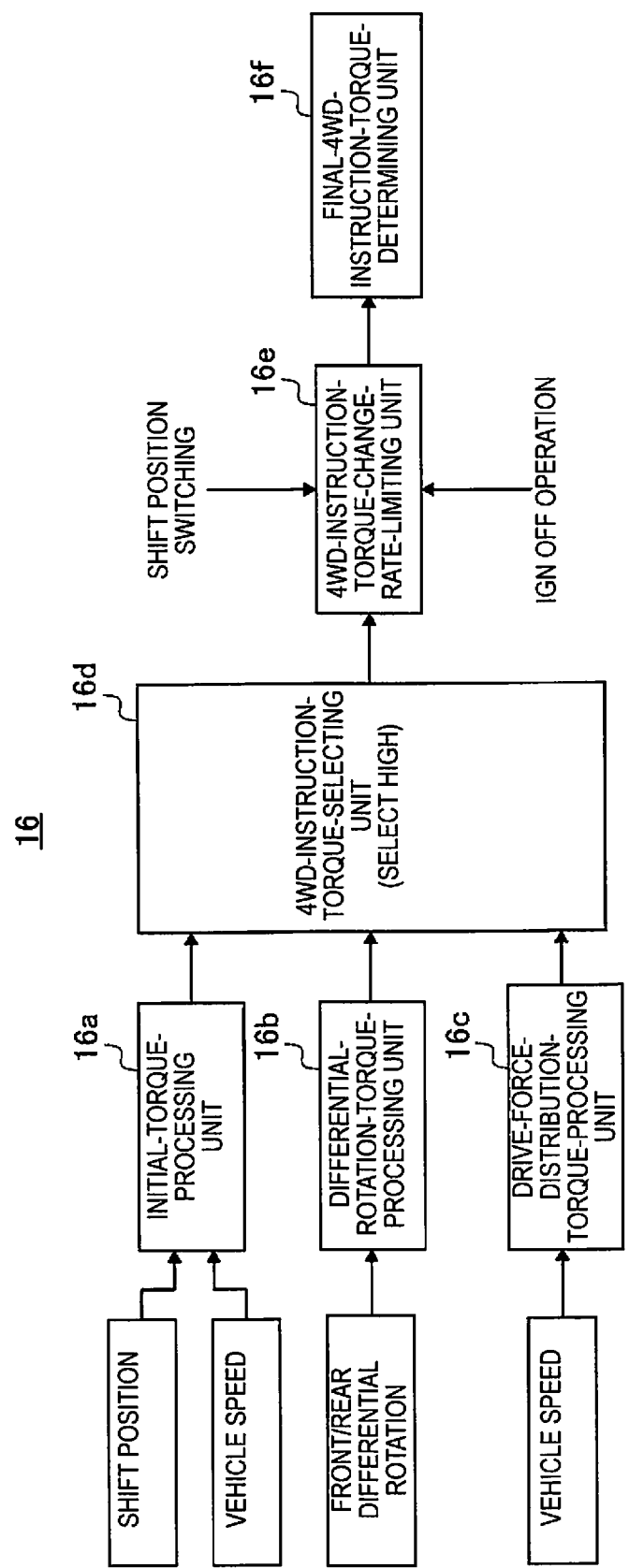
FIG. 4 is a control block diagram showing a configuration of an automatic 4WD control executed by a 4WD controller when an "auto mode" is selected in the 4WD control system of the first embodiment.
Figure 5:
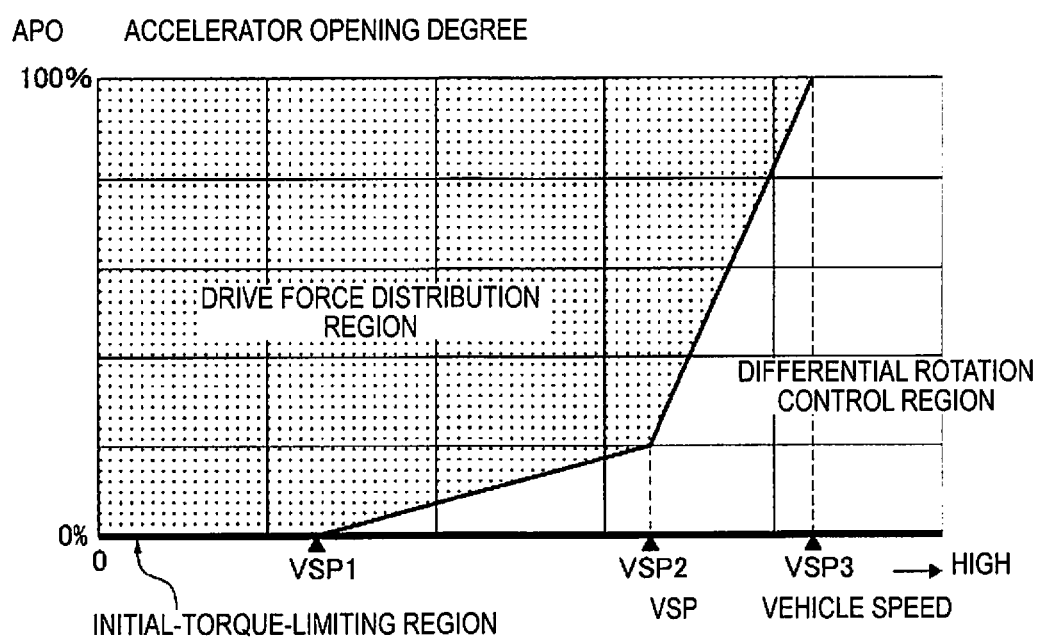
FIG. 5 is a partitioned overview diagram showing a partitioned overview of an initial torque control region, a differential rotation control region, and a drive force distribution region, said regions being selected in the automatic 4WD control when the "auto mode" is selected in the 4WD control system of the first embodiment.

FIG. 4 shows a configuration of an automatic 4WD control when an "auto mode" provided to the 4WD controller 16 in the first embodiment is selected. FIG. 5 shows a partitioned overview of three control regions when the "auto mode" is selected. FIGS. 6-10 show maps used in an automatic 4WD control. The configuration of the automatic 4WD control is described below on the basis of FIGS. 4-10.

The 4WD controller 16 has an initial-torque-processing unit 16a, a differential-rotation-torque-processing unit 16b, a drive-force-distribution-torque-processing unit 16c, a 4WD-instruction-torque-selecting unit 16d, a 4WD-instruction-torque-change-rate-limiting unit 16e, and a final-4WD-instruction-torque-determining unit 16f, as shown in FIG. 4.

The partitioned overview of three control regions when the "auto mode" is selected is described on the basis of FIG. 5. An initial torque control region, in which torque from the initial-torque-processing unit 16a is selected as the 4WD instruction torque in the automatic 4WD control, is an all-vehicle-speed region that includes a stopped state in which the accelerator position APO is equal to zero, as shown in FIG. 5. A differential rotation control region, in which torque from the differential-rotation-torque-processing unit 16b is selected as the 4WD instruction torque in the automatic 4WD control, is a high-vehicle-speed region in which the accelerator position APO is greater than zero and the vehicle speed VSP exceeds VSP3 (which is, e.g., approximately 85 km/h), as shown in FIG. 5. When torque from the drive-force-distribution-processing unit 16c is selected as the 4WD instruction torque in the automatic 4WD control, a drive force distribution region is in a low-vehicle-speed region in which the accelerator position APO is greater than zero and the vehicle speed VSP is less than VSP1 (which is, e.g., approximately 25 km/h). In the case of an intermediate-vehicle-speed region in which the accelerator position APO is greater than zero and the vehicle speed VSP satisfies the relationship VSP1≤VSP≤VSP3, a high torque from among the torque from the differential-rotation-torque-processing unit 16b and the torque from the drive-force-distribution-torque-processing unit 16c is selected as the 4WD instruction torque. In the case of the intermediate-vehicle-speed region in which the vehicle speed VSP satisfies the relationship VSP1≤VSP≤VSP3, the drive force distribution region decreases in size and the differential rotation control region increases in size as the vehicle speed VSP increases.

The initial-torque-processing unit 16a assigns a very low torque, i.e., approximately several Nm as the initial torque when the vehicle speed VSP at the time of an accelerator OFF operation exceeds a set vehicle speed VSP0 (e.g., approximately 20 km/h). When the vehicle speed VSP at the time of the accelerator OFF operation is equal to or less than the set vehicle speed VSP0, any of a first initial torque Tr1, a second initial torque Tr2, and a third initial torque Tr3 is set in accordance with the shift position. The initial torque thus determined is outputted to the 4WD-instruction-torque-selecting unit 16*d*.

Figure 6:
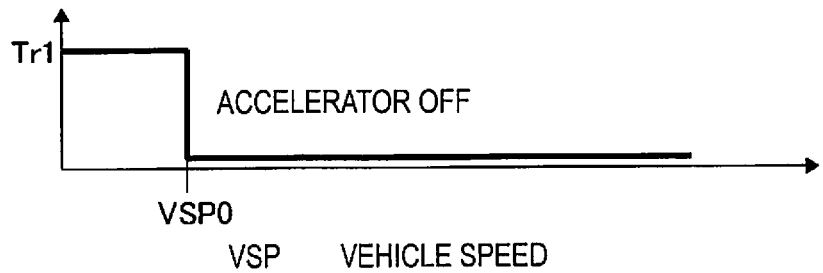
FIG. 6 is a diagram showing a first initial torque map in which there is set a first initial torque to be outputted from an initial-torque-processing unit at the time of an accelerator OFF operation while in a D position.

A magnitude of the first initial torque Tr1 when the vehicle speed VSP is equal to or less than the set vehicle speed VSP0 in the D position is set to a magnitude that is necessary for maintaining a torsion state of the cam mechanism by torque transmitted to an auxiliary-drive-wheel drive system before the vehicle stops, as indicated by a first initial torque map Mp1 in FIG. 6. More specifically, in instances where creep torque when the vehicle is stopped in the D position is distributed to the main drive wheels and the auxiliary drive wheels, the aforementioned magnitude is set to a magnitude (e.g., a magnitude where Tr1=approximately 180 Nm) of torque that is necessary for setting the ratio of the distribution of torque to the left and right front wheels 6, 7, which are the main drive wheels, and the distribution of torque to the left and right rear wheels 14, 15, which are the auxiliary drive wheels, to 50%:50%.

The creep torque when the vehicle is stopped in the D position can be calculated using: an engine speed Ne (idling speed) of the transverse engine 1; characteristics of the torque converter 2*a*; and a total reduction ratio achieved by the forward/rearward-progress-switching mechanism 2*b*, the continuously variable transmission mechanism 2*c*, and the final reduction mechanism 2*d*. Specifically, when the torque capacity coefficient T and the torque ratio t of the torque converter 2*a* are known, the creep torque can be calculated using the following formulas.

$$\text{Torque converter output torque} = t \times \Sigma Ne^2$$

$$\text{Creep torque while vehicle is stopped} = \text{torque converter output torque} \times \text{total reduction ratio}$$

Accordingly, the magnitude of the first initial torque Tr1 when the vehicle speed VSP is equal to or less than the set vehicle speed VSP0 in the D position is set to half a magnitude of the creep torque when the vehicle is stopped as obtained by the above calculation. A configuration may be adopted in which the magnitude of the creep torque when the vehicle is stopped is obtained by experimentation rather than by calculation.

Figure 7:
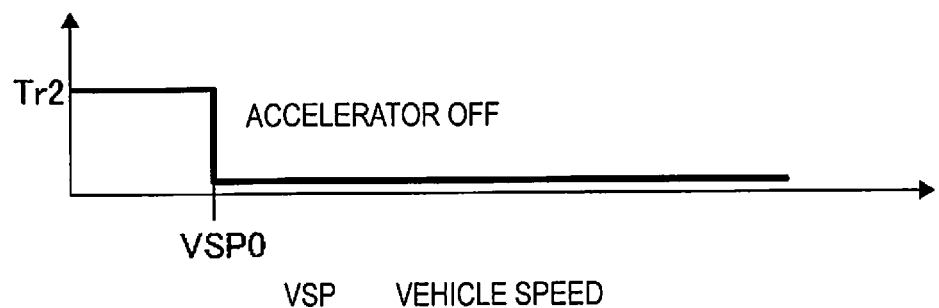
FIG. 7 is a diagram showing a second initial torque map in which there is set a second initial torque to be outputted from the initial-torque-processing unit at the time of an accelerator OFF operation while in an R position.

A magnitude of the second initial torque Tr2 (which is less than Tr1) when the vehicle speed VSP is equal to or less than the set vehicle speed VSP0 in the R position is set to a magnitude that is necessary for maintaining the torsion state of the cam mechanism by torque transmitted to the auxiliary-drive-wheel drive system before the vehicle stops, as indicated by a second initial torque map Mp2 in FIG. 7. More specifically, in instances where creep torque when the vehicle is stopped in the R position is distributed to the main drive wheels and the auxiliary drive wheels, the aforementioned magnitude is set to a magnitude of torque that is necessary for setting the ratio of the distribution of torque to the left and right front wheels 6, 7, which are the main drive wheels, and the distribution of torque to the left and right rear wheels 14, 15, which are the auxiliary drive wheels, to 50%:50%.

The creep torque when the vehicle is stopped in the R position can be calculated in the same manner as that in the D position, using the engine speed Ne (idling speed) of the transverse engine 1, the characteristics of the torque converter 2*a*, and the total reduction ratio.

Figure 8:
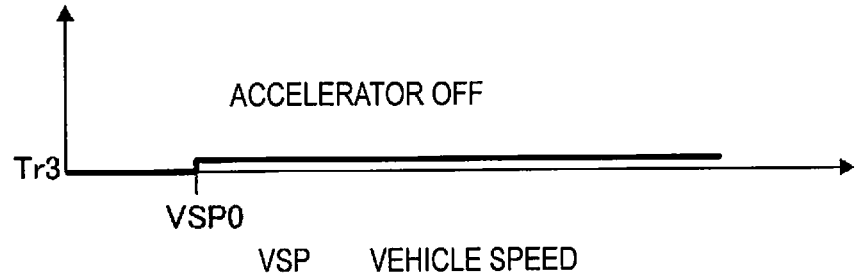
FIG. 8 is a diagram showing a third initial torque map in which there is set a third initial torque to be outputted from the initial-torque-processing unit in association with a shift-position-switching operation (from D to N and then to R, or from R to N and then to D) during the accelerator OFF operation.

A magnitude of the third initial torque Tr3 when the vehicle speed VSP is equal to or less than the set vehicle speed VSP0, the third initial torque Tr3 accompanying a shift-position-switching operation (from D to N and then to R, or from R to N and then to D), is set so that Tr3=0 (zero torque), as shown in a third initial torque map Mp3 in FIG. 8.

When front/rear differential rotation ΔN occurs during travel due to an accelerator ON operation, the differential-rotation-torque-processing unit 16*b* sets a 4WD clutch torque that corresponds to the front/rear differential rotation ΔN. The WD clutch torque thus determined is outputted to the 4WD-instruction-torque-selecting unit 16*d*.

Figure 9:
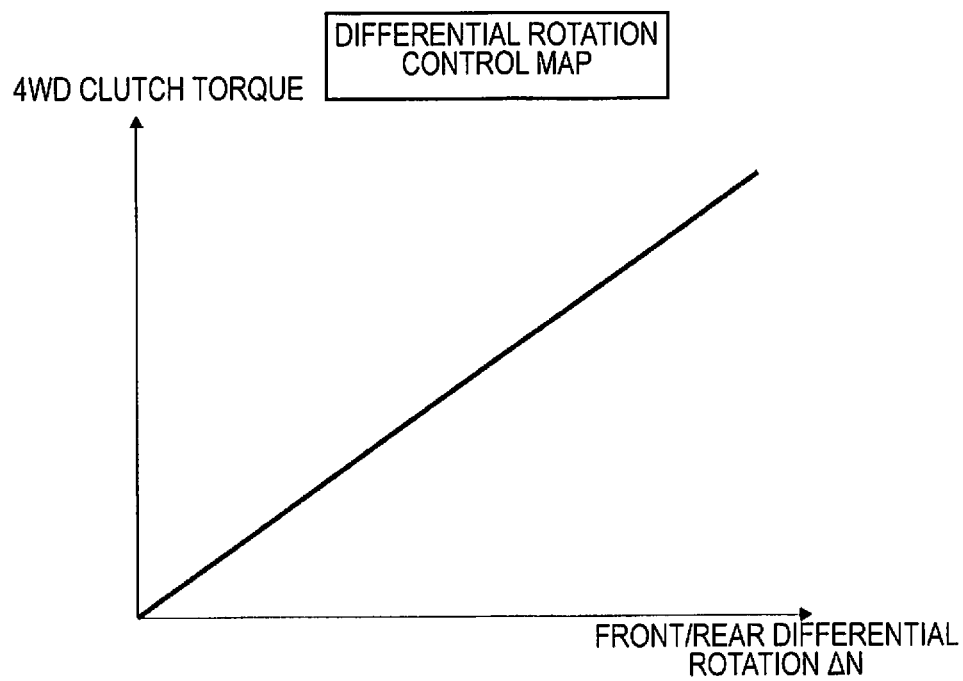
FIG. 9 is a diagram showing a differential rotation control map in which there is set a 4WD clutch torque to be outputted from a differential-rotation-torque-processing unit at the time of an accelerator ON operation.

The 4WD clutch torque determined in accordance with the front/rear differential rotation ΔN is of such magnitude as to increase in proportion with an increase in the front/rear differential rotation ΔN, as shown in a differential rotation control map in FIG. 9. Specifically, when the front/rear differential rotation ΔN occurs due to drive slippage during travel, the torque distribution to the left and right rear wheels 14, 15 is increased, whereby the torque distribution to the left and right front wheels 6, 7 is reduced so that the resulting torque can suppress drive slippage. The front/rear differential rotation ΔN is calculated through a vehicle wheel speed difference obtained by subtracting an average vehicle wheel speed of left and right rear wheel speeds VRL, VRR from an average vehicle wheel speed of left and right front wheel speeds VFL, VFR.

The drive-force-distribution-torque-processing unit 16*c* sets the 4WD clutch torque in accordance with the vehicle speed VSP so as to enhance the setting-off performance of the vehicle in the low-vehicle-speed region (a setting-off region) due to the accelerator ON operation. The 4WD clutch torque thus determined is outputted to the 4WD-instruction-torque-selecting unit 16*d*.

Figure 10:
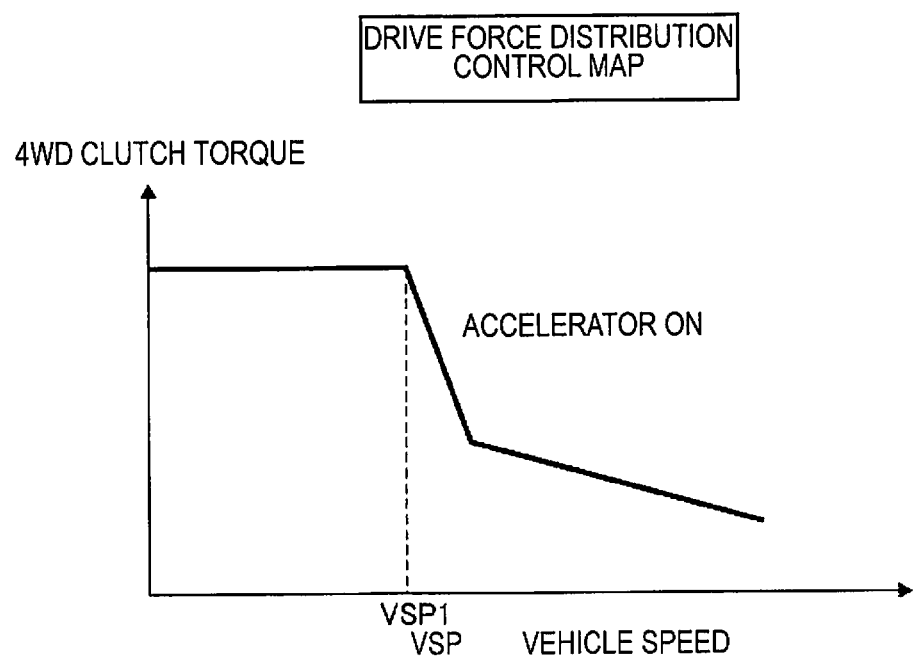
FIG. 10 is a diagram showing a drive force distribution control map in which there is set a 4WD clutch torque to be outputted from a drive-force-distribution-torque-processing unit at the time of the accelerator ON operation.

The 4WD clutch torque determined in accordance with the vehicle speed VSP is applied at a magnitude that effects a 4WD state in which the ratio of the torque distribution to the front and rear wheels is substantially 50%:50% in a region in which the vehicle speed VSP is equal to or less than VSP1, as shown in a drive force distribution control map of FIG. 10. This ensures stabilized setting off even when the vehicle starts off on a slippery road surface. In a range in which the vehicle speed VSP exceeds VSP1, the ratio of the torque distribution to the front and rear wheels is reduced to a ratio close to a 2WD state, as shown in the drive force distribution control map in FIG. 10, thereby contributing to an improvement in fuel economy.

The 4WD-instruction-torque-selecting unit 16*d* selects the 4WD instruction torque by selecting a high torque outputted from the initial-torque-processing unit 16*a*, the differential-rotation-torque-processing unit 16*b*, and the drive-force-distribution-torque-processing unit 16*c*. When the accelerator position APO is equal to zero, zero torque is outputted from the differential-rotation-torque-processing unit 16*b* and the drive-force-distribution-torque-processing unit 16*c*, whereby one of the initial torques Tr1, Tr2, Tr3 from the initial-torque-processing unit 16*a* is selected as the 4WD instruction torque. However, when the accelerator position APO is greater than zero, zero torque is outputted from the initial-torque-processing unit 16*a*, whereby a high torque from among the torque outputted from the differential-rotation-torque-processing unit 16*b* and the torque outputted from the drive-force-distribution-torque-processing unit 16*c* is selected as the 4WD instruction torque.

The 4WD-instruction-torque-change-rate-limiting unit 16*e* switches the torque selected by the 4WD-instruction-torque-selecting unit 16*d*, thereby applying a limit to a torque change rate from a prior selected torque to a current selected torque when there is a gap between the prior selected torque and the current selected torque. Herein, the 4WD-instruction-torque-change-rate-limiting unit 16e has a first torque change rate at which a gradient of torque change is abrupt, a second torque change rate at which the gradient of torque change is gentler than at the first torque change rate, and a third torque change rate at which the gradient of torque change is gentler than at the second torque change rate. When the initial torque is reduced to zero torque by a shift-position-switching operation at an accelerator position APO of zero, the first torque change rate, which places emphasis on responsiveness, is selected. During a reduction from the 4WD clutch torque to the initial torque, or during an increase from the initial torque to the 4WD clutch torque, the second torque change rate, which balances both improvement of responsiveness and prevention of discomfort, is selected. When the ignition switch 25 is turned OFF, the third torque change rate, which places emphasis on prevention of discomfort, is selected.

The final-4WD-instruction-torque-determining unit 16f determines, as a final 4WD instruction torque, a 4WD instruction torque to which the torque change rate limit outputted from the 4WD-instruction-torque-change-rate-limiting unit 16e is applied. When the final 4WD instruction torque is determined by the final-4WD-instruction-torque-determining unit 16f, the determined 4WD instruction torque is converted to a solenoid command current. The converted solenoid command current is outputted from the 4WD controller 16 to the 4WD solenoid 24 of the electronic control coupling 10.

Configuration of Initial Torque Control Process

Figure 11:
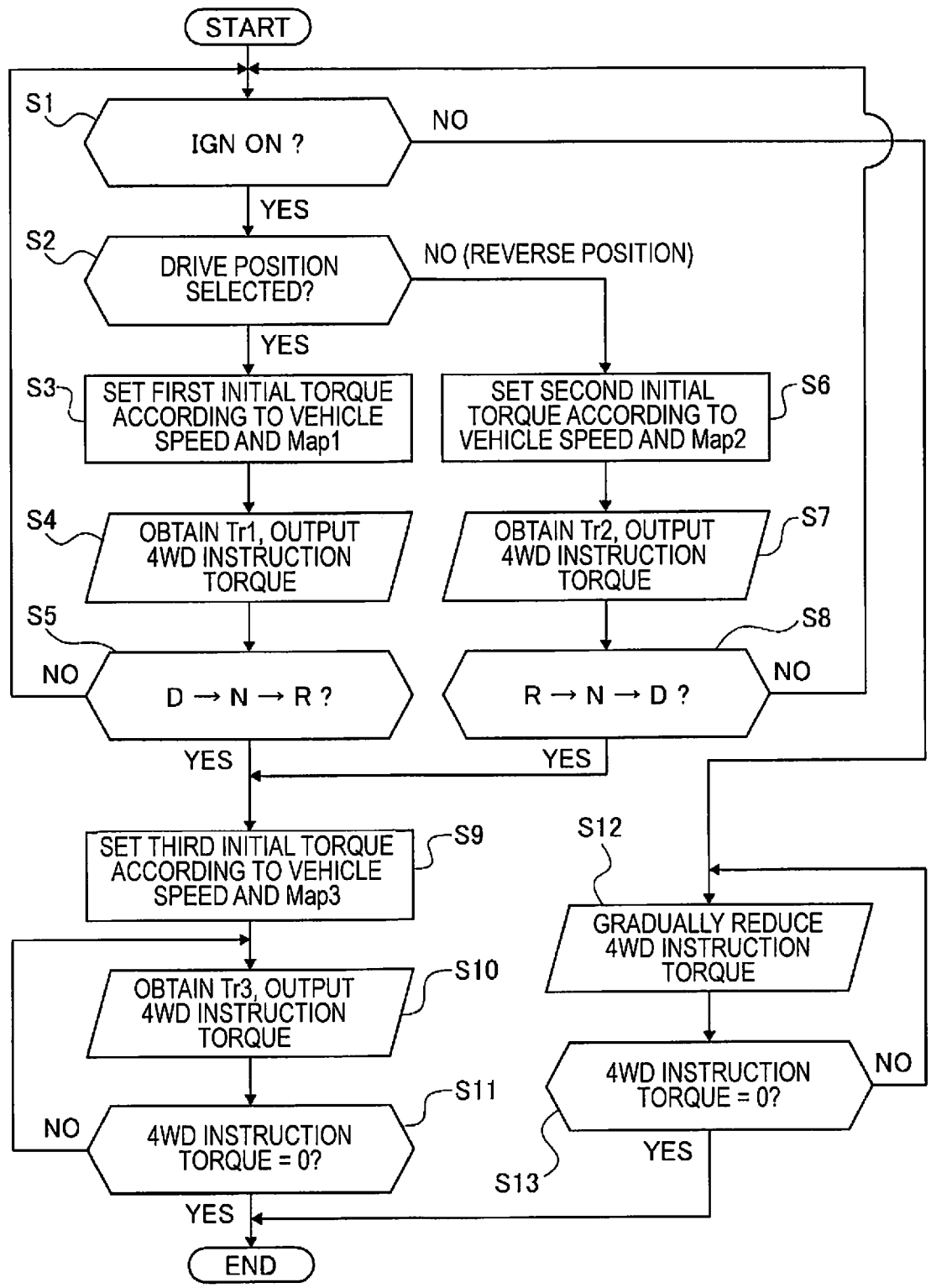
FIG. 11 is a flow chart showing a flow of initial torque control processes executed by the initial-torque-processing unit of a 4WD controller of the first embodiment.

FIG. 11 shows a flow of initial torque control processes executed by the initial-torque-processing unit 16a of the 4WD controller 16. The steps in FIG. 11, which shows a configuration of an initial torque control process, are described below. A process in this flow chart is started when a travel shift position (D position or R position) is selected, i.e., when the accelerator position APO is equal to zero. The process ends when the accelerator position APO is greater than zero.

In step S1, it is determined whether or not the ignition switch 25 is in an ON state. The process proceeds to step S2 when the result is YES (IGN ON), but proceeds to step S12 when the result is NO (IGN OFF).

In step S2, following from the determination of "IGN ON" in step S1, it is determined whether or not the D position is selected. The process proceeds to step S3 when the result is YES (D position selected), but proceeds to step S6 when the result is NO (R position selected). The determination of whether the selected shift position is the "D position" or the "R position" is performed in accordance with a switch signal from the inhibitor switch 26.

In step S3, following from the determination that the D position is selected in step S2, the first initial torque Tr1 is set according to the first initial torque map Mp1 in FIG. 6 and the vehicle speed VSP at that time. The process then proceeds to step S4. When the vehicle speed VSP in the D position is equal to or less than the set vehicle speed VSP0, a torque value having a magnitude that is half that of the creep torque when the vehicle is stopped is set as the first initial torque Tr1.

In step S4, following from the setting of the first initial torque Tr1 in step S3, a 4WD instruction torque (solenoid command current) for obtaining the set first initial torque Tr1 is outputted to the 4WD solenoid 24 of the electronic control coupling 10. The process then proceeds to step S5.

In step S5, following from the output of the 4WD instruction torque for obtaining Tr1 in step S4, it is determined whether or not the shift position has been switched from the D position to the N position and then to the R position. The process proceeds to step S9 when the result is YES (there is a switching operation from D to N and then to R), but proceeds to step S1 when the result is NO (there is not a switching operation from D to N and then to R). The determination as to whether or not there is a "switching operation from D to N and then to R" is performed in accordance with a switch signal from the inhibitor switch 26.

In step S6, following from the determination that the R position is selected in step S2, the second initial torque Tr2 is set according to the second initial torque map Mp2 in FIG. 7 and the vehicle speed VSP at that time. The process then proceeds to step S7. When the vehicle speed VSP in the R position is equal to or less than the set vehicle speed VSP0, a torque value having a magnitude that is half that of the creep torque when the vehicle is stopped is set as the second initial torque Tr2.

In step S7, following from the setting of the second initial torque Tr2 in step S6, a 4WD instruction torque (solenoid command current) for obtaining the set second initial torque Tr2 is outputted to the 4WD solenoid 24 of the electronic control coupling 10. The process then proceeds to step S8.

In step S8, following from the output of the 4WD instruction torque for obtaining Tr2 in step S7, it is determined whether or not the shift position has been switched from the R position to the N position and then to the D position. The process proceeds to step S9 when the result is YES (there is a switching operation from R to N and then to D), but proceeds to step S1 when the result is NO (there is not a switching operation from R to N and then to D). The determination as to whether or not there is a "switching operation from R to N and then to D" is performed in accordance with a switch signal from the inhibitor switch 26.

In step S9, following from the determination that there is a switching operation from D to N and then to R in step S5, or from the determination that there is a switching operation from R to N and then to D in step S8, the third initial torque Tr3 is set according to the third initial torque map Mp3 in FIG. 8 and the vehicle speed VSP at that time. The process then proceeds to step S10. When the vehicle speed VSP in a case where there is a shift-position-switching operation is equal to or less than the set vehicle speed VSP0, the third initial torque Tr3 is set so that Tr3=0.

In step S10, following from the setting of the third initial torque Tr3 in step S9, a 4WD instruction torque (solenoid command current) for obtaining the set third initial torque Tr3 is outputted to the 4WD solenoid 24 of the electronic control coupling 10. The process then proceeds to step S11.

In step S11, following from the reduction of the 4WD instruction torque according to an abrupt change gradient in step S10, it is determined whether or not the 4WD instruction torque has reached zero. The process ends when the result is YES (a 4WD instruction torque of 0 has been reached), but proceeds to step S10 when the result is NO (a 4WD instruction torque of 0 has not yet been reached).

In step S12, following from the determination of "IGN OFF" in step S1, or from the determination that a 4WD instruction torque of 0 has not yet been reached in step S13, a 4WD instruction torque (solenoid command current) for gradually reducing the 4WD instruction torque being outputted at this time to a 4WD instruction torque of zero is outputted to the 4WD solenoid 24 of the electronic control coupling 10. The process then proceeds to step S13.

In step S13, following from the reduction of the 4WD instruction torque according to a gentle change gradient in step S12, it is determined whether or not the 4WD instruction torque has reached zero. The process ends when the result is YES (a 4WD instruction torque of 0 has been reached), but proceeds to step S12 when the result is NO (a 4WD instruction torque of 0 has not yet been reached).

An action of the present invention is described next. A description of the action of the first embodiment is divided into "an initial torque control process action," "a clutch control action in a scenario in which the vehicle starts off again," "an initial torque setting action," "a clutch control action in a scenario in which a shift position is switched and the vehicle is stopped," and "a clutch control action in a scenario in which the ignition is turned OFF and the vehicle is stopped."

Initial Torque Control Process Action

An initial torque control process action, which is executed by the initial-torque-processing unit 16a of the 4WD controller 16 while the "auto mode" is selected and during an operation to release the accelerator, is described on the basis of the flow chart in FIG. 11.

At the time of a reduction in speed from a forward traveling state to a stopped state while selection of the D position is maintained, or at a time when the vehicle is stopped, the flow in the flow chart in FIG. 11 repeatedly proceeds in a sequence from step S1 through step S2, step S3, and step S4 to step S5. In step S3, the first initial torque Tr1 is set according to the first initial torque map Mp1 in FIG. 6 and the vehicle speed VSP at that time. In the subsequent step S4, the 4WD instruction torque for obtaining the set first initial torque Tr1 is outputted. Specifically, at the time of a reduction in speed while in a D position in which the vehicle speed VSP is equal to or less than the set vehicle speed VSP0, or at a time when the vehicle is stopped in the D position, there is performed a control for applying a torque value (i.e., the first initial torque Tr1) having a magnitude that is half that of the creep torque when the vehicle is stopped in the D position.

At the time of a reduction in speed from a state of traveling in reverse to a stopped state while selection of the R position is maintained, or at a time when the vehicle is stopped, the flow in the flow chart in FIG. 11 repeatedly proceeds in a sequence from step S1 through step S2, step S6, and step S7 to step S8. In step S6, the second initial torque Tr2 is set according to the second initial torque map Mp2 in FIG. 7 and the vehicle speed VSP at that time. In the subsequent step S7, the 4WD instruction torque for obtaining the set second initial torque Tr2 is outputted. Specifically, at the time of a reduction in speed while in an R position in which the vehicle speed VSP is equal to or less than the set vehicle speed VSP0, or at a time when the vehicle is stopped in the R position, there is performed a control for applying a torque value (i.e., the second initial torque Tr2) having a magnitude that is half that of the creep torque when the vehicle is stopped in the R position.

When the shift position is switched from a reduction in speed while in the D position or from stopping in the D position through the N position to the R position, the flow in the flow chart in FIG. 11 proceeds from step S5 through a sequence from step S9 through step S10 to step S11. While it is determined in step S11 that a 4WD instruction torque of zero has not yet been reached, the flow repeatedly proceeds in a sequence from step S10 to step S11, but once it is determined in step S11 that a 4WD instruction torque of zero has been reached, the flow ends after step S11. In step S9, the third initial torque Tr3 is set according to the third initial torque map Mp3 in FIG. 8 and the vehicle speed VSP at that time. The flow then proceeds to step S10. In the subsequent step S10, a 4WD instruction torque for obtaining the set third initial torque Tr3 is outputted. Specifically, when a position switching operation from D to N and then to R is performed while the vehicle speed VSP is equal to or less than the set vehicle speed VSP0, there is performed a control for abruptly reducing the initial torque that had been in place before then to zero torque.

When the shift position is switched from a reduction in speed while in the R position or from stopping in the R position through the N position to the D position, the flow in the flow chart in FIG. 11 proceeds from step S8 through the sequence from step S9 through step S10 to step S11. While it is determined in step S11 that a 4WD instruction torque of zero has not yet been reached, the flow repeatedly proceeds in the sequence from step S10 to step S11, but once it is determined in step S11 that a 4WD instruction torque of zero has been reached, the flow ends after step S11. Specifically, when a position switching operation from R to N and then to D is performed while the vehicle speed VSP is equal to or less than the set vehicle speed VSP0, similarly to when a position switching operation from D to N and then to R is performed, there is performed a control for abruptly reducing the initial torque that had been in place before then to zero torque.

When the ignition switch 25 is turned OFF when the vehicle is stopped in the D position or when the vehicle is stopped in the R position, the flow in the flow chart in FIG. 11 proceeds from step S1 through a sequence from step S12 to step S13. While it is determined in step S13 that a 4WD instruction torque of zero has not yet been reached, the flow repeatedly proceeds in the sequence from step S12 to step S13, but once it is determined in step S13 that a 4WD instruction torque of zero has been reached, the flow ends after step S13. Specifically, when an ignition OFF operation has been performed, there is performed a control for gradually reducing the 4WD instruction torque that had been outputted to a 4WD instruction torque of zero.

Figure 12:
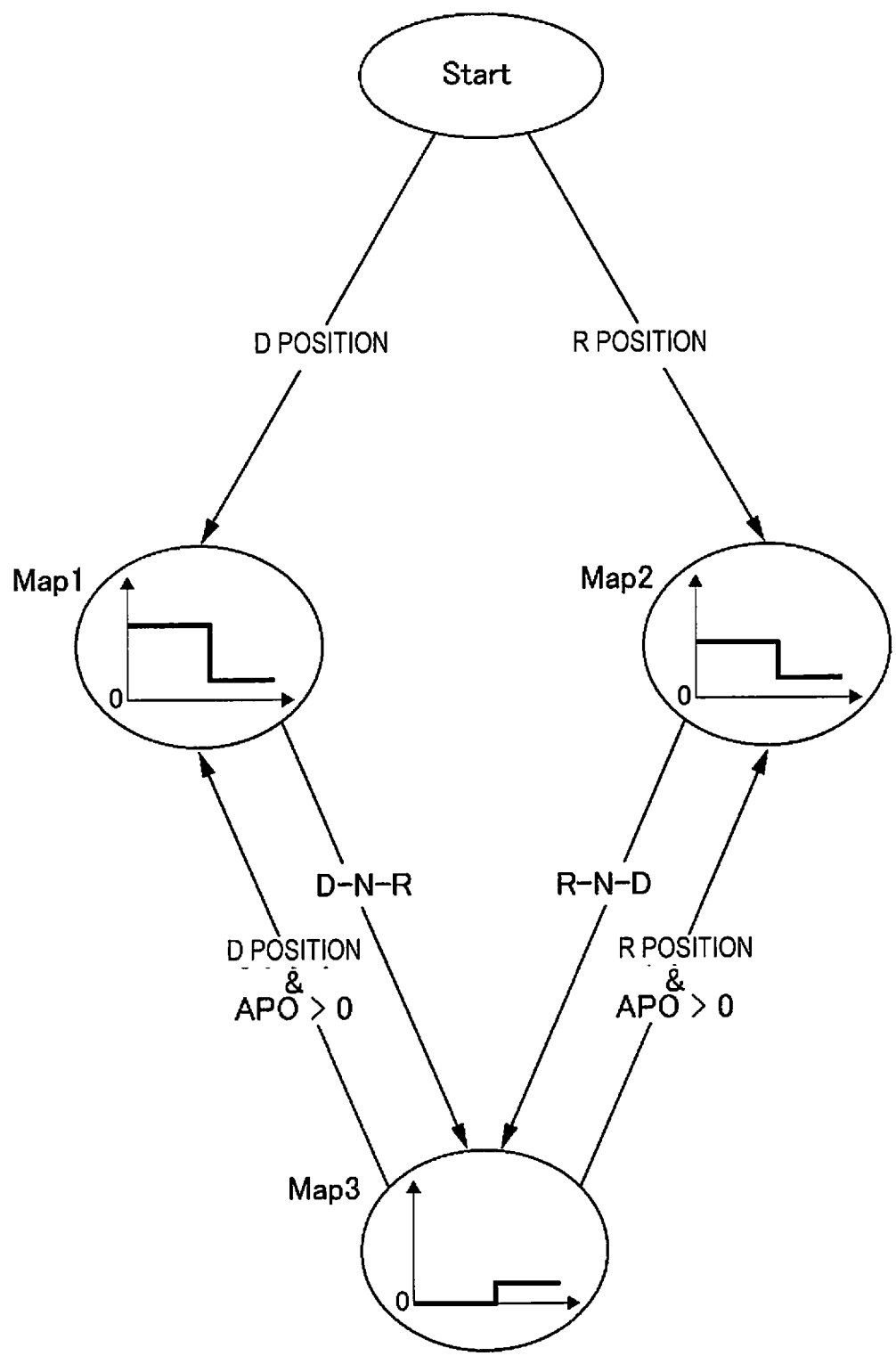
FIG. 12 is a mode transition diagram showing a mode transition action in the initial torque control processes executed by the 4WD controller of the first embodiment.

A control mode transition action according to the initial torque control process action executed by the initial-torque-processing unit 16a in this manner is described on the basis of FIG. 12.

First, when APO changes over from being greater than zero to being equal to zero while the D position is selected, a transition is made from a control mode for applying initial torque using the third initial torque map Mp3 to a control mode for applying initial torque using the first initial torque map Mp1, as shown in FIG. 12. At the time of a reduction in speed while in the D position and while APO is equal to zero, or at a time when the vehicle is stopped in the D position, the control mode for applying initial torque using the first initial torque map Mp1 is maintained, as shown in FIG. 12. However, when a position switching operation from D to N and then to R is performed while APO is equal to zero, a transition is made from a control mode for applying initial torque using the first initial torque map Mp1 to a control mode for applying initial torque using the third initial torque map Mp3, as shown in FIG. 12.

When APO changes over from being greater than zero to being equal to zero while the R position is selected, a transition is made from a control mode for applying initial torque using the third initial torque map Mp3 to a control mode for applying initial torque using the second initial torque map Mp2, as shown in FIG. 12. At the time of a reduction in speed while in the R position and while APO is equal to zero, or at a time when the vehicle is stopped in the R position, the control mode for applying initial torque using the second initial torque map Mp2 is maintained, as shown in FIG. 12. However, when a position switching operation from R to N and then to D is performed while APO is equal to zero, a transition is made from a control mode for applying initial torque using the second initial torque map Mp2 to a control mode for applying initial torque using the third initial torque map Mp3, as shown in FIG. 12.

Clutch Control Action in Scenario in which Vehicle Starts Off Again

Figure 13:
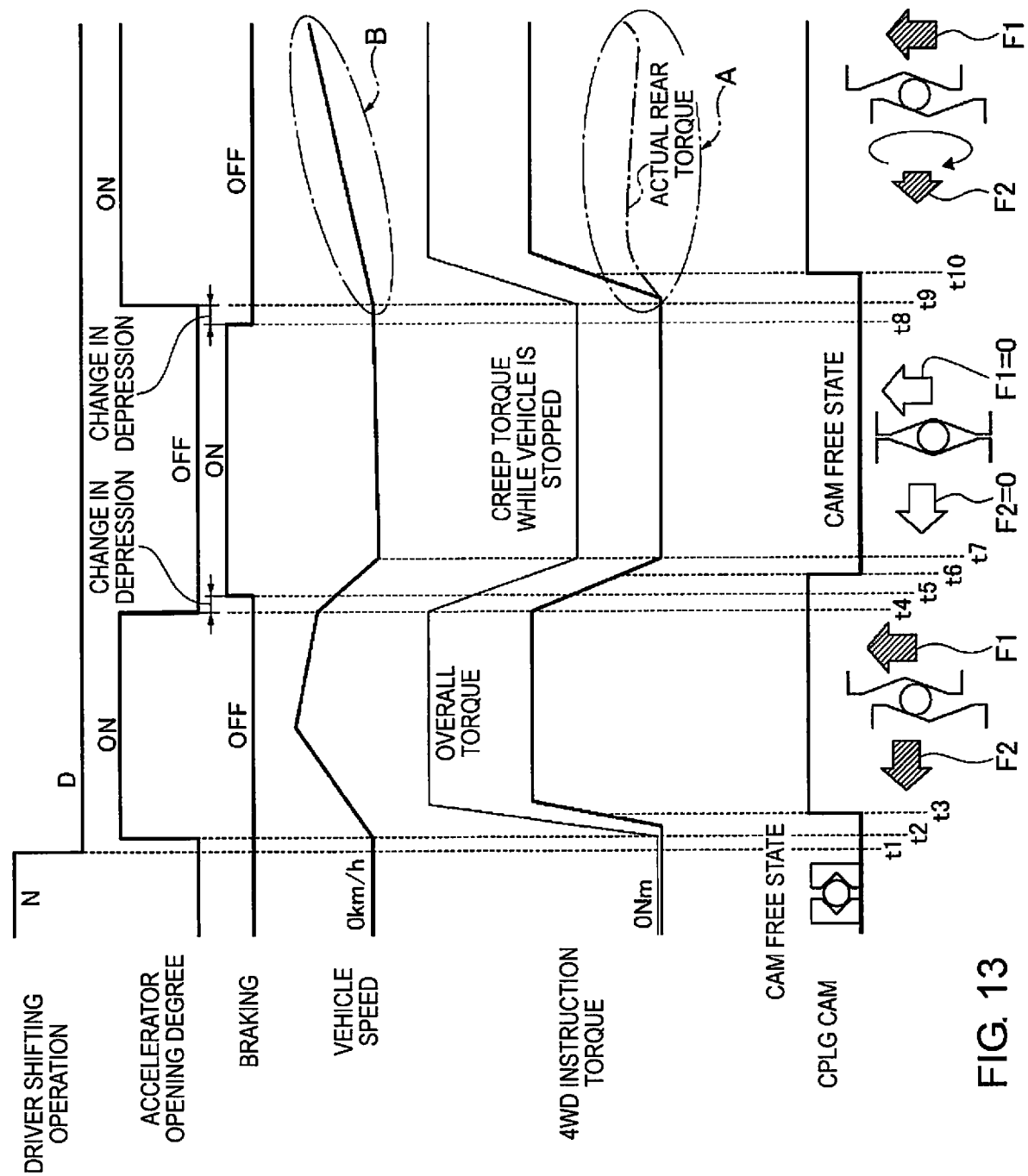
FIG. 13 is a time chart showing various characteristics pertaining to a driver shifting operation, an accelerator position, braking, a vehicle speed, an overall torque, a 4WD instruction torque, and a state of a coupling cam at a time when a transition is made progressively from the N position, to traveling after having set off in the D position and remained in the D position, to stopping, and to setting off again in a comparative example.

FIG. 13 is a time chart showing various characteristics in a scenario in which a transition is made progressively from the N position, to traveling after having set off in the D position and remained in the D position, to stopping, and to setting off again in a comparative example in which zero torque is applied as initial torque at a time when the vehicle is stopped. A clutch control action in a scenario in which the vehicle starts off again in the comparative example is described below on the basis of FIG. 13.

While the vehicle is stopped in the N position, a shift is made from the N position to the D position at time t1, and an accelerator depressing operation is performed at time t2. Performing an accelerator ON operation at time t2 starts a control for applying 4WD instruction torque according to a drive force distribution map shown in FIG. 10, causes a cam mechanism of an electronic control coupling to enter a cam torsion state at time t3, and starts generation of axial clutch pressing force. Accordingly, the vehicle starts to move from immediately after time t2, rear torque is transmitted to the left and right rear wheels starting from time t3, and a vehicle speed increases due to high setting-off performance in a 4WD state.

When an accelerator OFF operation is performed at time t4 while the vehicle is traveling in the D position, the 4WD instruction torque that had been applied before then starts to be reduced toward zero. Furthermore, when an accelerator ON operation is performed according to a change in depression intended to stop the vehicle at time t5, the 4WD instruction torque continues to be reduced. This reduction in the 4WD instruction torque causes the cam mechanism of the electronic control coupling to change over from the cam torsion state to a cam free state at time t6. Accordingly, the axial clutch pressing force is eliminated and a 2WD state comes into effect starting from time t6, and the vehicle stops at time t7.

When a brake OFF operation is performed at time t8 and an accelerator ON operation is performed at time t9 according to a change in depression intended to cause the vehicle to set off again while the vehicle is in a stopped state in the D position, the 4WD instruction torque starts to be increased to cause the 4WD instruction torque to immediately change over from zero torque to a four-wheel-drive distribution. This increase in the 4WD instruction torque causes the cam mechanism of the electronic control coupling to change over from the cam free state to the cam torsion state at time t10. However, drive slippage occurs in front wheels, and responsiveness of torque transmission to the rear wheels is reduced.

Specifically, while the vehicle is stopped until time t9, the cam mechanism of the electronic control coupling is in a cam free state (2WD state), and engine torque based on the accelerator ON operation is transmitted only to the front wheels even when the accelerator ON operation is performed at time t9. Therefore, drive slippage occurs when a road-surface grip boundary is exceeded by front-wheel tires due to, for example, an abrupt accelerator ON operation, or an accelerator ON operation performed on a low-μ road. When drive slippage occurs in the front wheels, a plate linked to the front wheels from among clutch plates of a main clutch of the electronic control coupling over-rotates in accordance with drive slippage rotation and enters a clutch sliding state of rotating relative to a plate linked to the rear wheels, which are substantially stopped, from among the clutch plates.

Therefore, even when the 4WD instruction torque is outputted on the basis of the accelerator depressing operation intended to cause the vehicle to set off again, a prescribed period of time elapses in a state in which engagement torque (actual rear torque) in the electronic control coupling remains low, as indicated by a characteristic on a dashed-dotted line in an encircled area shown by arrow A in FIG. 13. Thus, a period of time is required for the electronic control coupling to change over from the cam free state to the cam torsion state, delaying an increase in the actual rear torque relative to the 4WD instruction torque in the electronic control coupling and reducing the responsiveness of torque transmission to the rear wheels.

As a result, a vehicle-speed increase gradient decreases at time t9 onward when the vehicle is setting off again, as indicated by a characteristic of vehicle speed in an encircled area shown by arrow B in FIG. 13, and responsiveness of setting off again is diminished. In order to suppress drive slippage in the front wheels, an accelerator operation performed by a driver when setting off again must be an operation for gently depressing an accelerator pedal.

Figure 14:
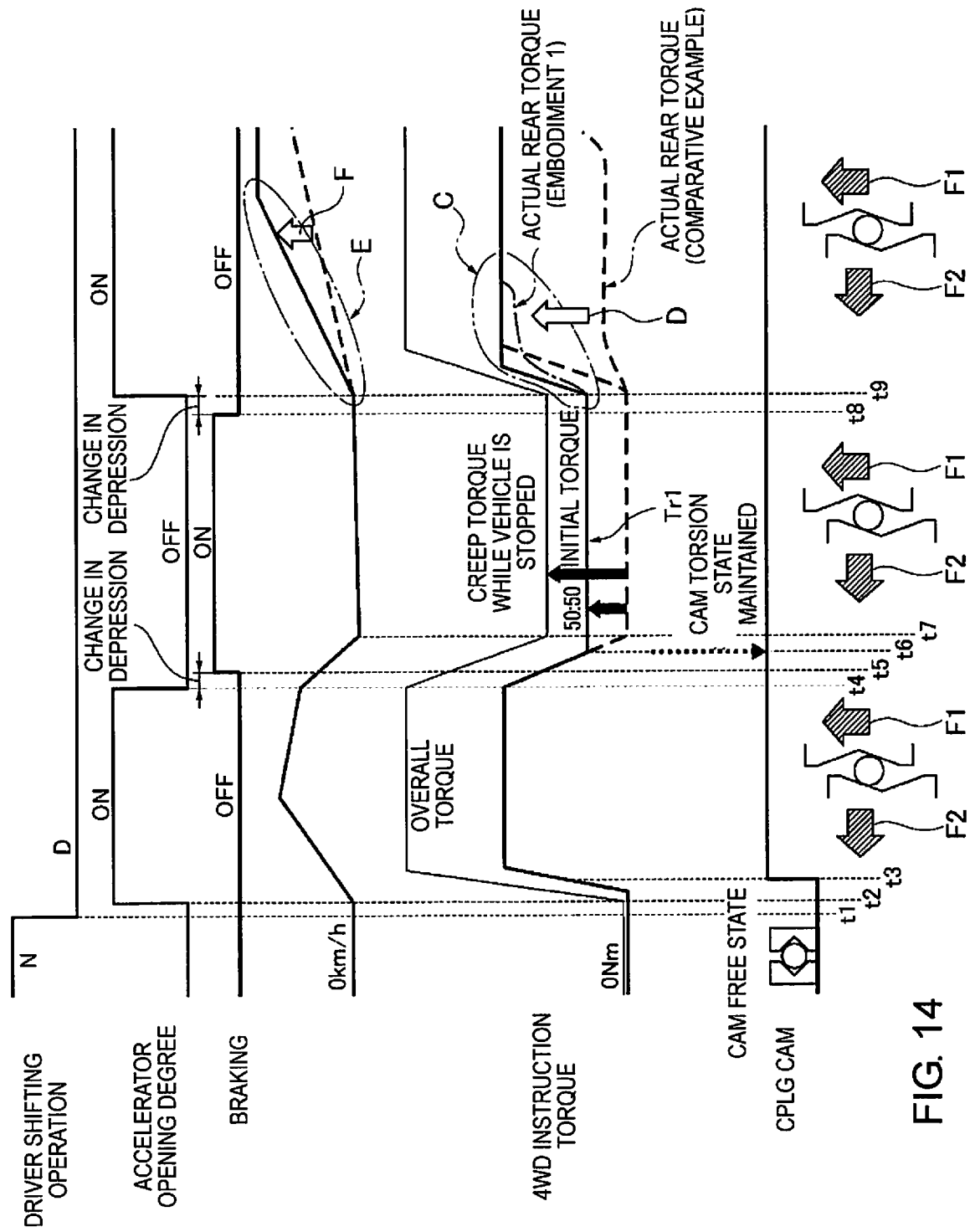
FIG. 14 is a time chart showing various characteristics pertaining to a driver shifting operation, an accelerator position, braking, the vehicle speed, the overall torque, the 4WD instruction torque, and a state of a coupling cam at a time when a transition is made progressively from the N position, to traveling after having set off in the D position and remained in the D position, to stopping, and to setting off again in the first embodiment.

FIG. 14 is a time chart showing various characteristics in a scenario in which a transition is made progressively from the N position, to traveling after having set off in the D position and remained in the D position, to stopping, and to setting off again in the first embodiment. A clutch control action in a scenario in which the vehicle starts off again in the first embodiment is described below on the basis of FIG. 14. This scenario is the same as that in the comparative example through time t3, and therefore a description of that portion of the scenario is omitted.

When an accelerator OFF operation is performed at time t4 while the vehicle is traveling in the D position, the 4WD instruction torque that had been applied before then starts to be reduced toward the first initial torque Tr1. Furthermore, when a brake ON operation is performed at time t5 according to a change in depression intended to stop the vehicle, the 4WD instruction torque is reduced to the first initial torque Tr1 at time t6. Accordingly, the cam mechanism of the electronic control coupling 10 is kept in a cam torsion state even at time t6 onward, and clutch pressing force F2 for pressing and engaging the main clutch 35 in an axial direction is generated. The vehicle thereby stops at time t7 while the 4WD state is maintained. Specifically, while the vehicle is stopped at time t7 onward, the vehicle stands by in preparation for an operation to set off again in the 4WD state, in which creep torque while the vehicle is stopped is equally distributed to the left and right front wheels 6, 7 and the left and right rear wheels 14, 15.

When a brake OFF operation is performed at time t8 and an accelerator ON operation is performed at time t9 according to a change in depression intended to cause the vehicle to set off again while the vehicle is in a 4WD stopped state in the D position, the 4WD instruction torque starts to be increased to cause the 4WD instruction torque to immediately change over from the first initial torque Tr1 to rigid 4WD. Thus, because the cam mechanism of the electronic control coupling 10 is kept in the cam torsion state even when the 4WD instruction torque increases, drive slippage in the left and right front wheels 6, 7 is prevented and responsiveness of torque transmission to the left and right rear wheels 14, 15 is improved.

Specifically, while the vehicle is stopped until time t9, the cam mechanism of the electronic control coupling 10 is not in a cam free state but rather is in a cam torsion state (4WD state). Therefore, when the 4WD instruction torque increases on the basis of the accelerator ON operation at time t9, the main clutch 35 is responsively engaged due to the clutch pressing force F2 without the electronic control coupling 10 needing to change over from the cam free state to the cam torsion state. Specifically, even when engine torque increases due to the accelerator ON operation being performed at time t9, the engine torque is distributed to the left and right front wheels 6, 7 and the left and right rear wheels 14, 15, and drive slippage in the left and right front wheels 6, 7 is suppressed.

Therefore, when the 4WD instruction torque is outputted on the basis of an accelerator depressing operation intended to cause the vehicle to set off again, the engagement torque (actual rear torque) in the electronic control coupling 10 responsively increases, as indicated by a characteristic on a dashed-dotted line in an encircled area shown by arrow C in FIG. 14. Thus, the actual rear torque responsively increases relative to the 4WD instruction torque in the electronic control coupling 10, whereby responsiveness of torque transmission to the left and right rear wheels 14, 15 is improved. Arrow D in FIG. 14 shows an extent of increase in the responsiveness of torque transmission for an actual-rear-torque characteristic (characteristic on a dashed-dotted line) in the first embodiment relative to the actual rear torque characteristic (characteristic on a dashed line) in the comparative example.

As a result, a vehicle-speed increase gradient increases at time t9 onward when the vehicle is setting off again according to the accelerator depressing operation, as indicated by a characteristic of vehicle speed (characteristic on a solid line) in an encircled area shown by arrow E in FIG. 14, leading to an improvement in the responsiveness of setting off again. Arrow F in FIG. 14 shows an extent of increase in the responsiveness of setting off again for a characteristic of vehicle speed (characteristic on a solid line) in the first embodiment relative to the characteristic of vehicle speed (characteristic on a dashed line) in the comparative example. An advantage [of this configuration] in terms of working of the accelerator by the driver is that [the driver is not forced to perform] an operation for gently depressing an accelerator pedal when setting off again.

Initial Torque Setting Action

There are described below an action for setting the magnitude of the first initial torque Tr1 when the vehicle speed VSP in the D position is equal to or less than the set vehicle speed VSP0, and an action for setting the magnitude of the second initial torque Tr2 when the vehicle speed VSP in the R position is equal to or less than the set vehicle speed VSP0.

A scheme for setting the magnitude of the first initial torque Tr1 and the second initial torque Tr2 according to the 4WD instruction torque is divided into the following three schemes.

(a) The 4WD instruction torque is set to a magnitude that is necessary for maintaining a torsion state of the cam mechanism (a torsion state of the auxiliary-drive-wheel drive system) by torque transmitted to the auxiliary-drive-wheel drive system before the vehicle stops.

(b) In instances where the creep torque when the vehicle is stopped is distributed to the main drive wheels and the auxiliary drive wheels, the 4WD instruction torque is set to a magnitude that is necessary for setting the ratio of the distribution of torque to the left and right front wheels 6, 7, which are the main drive wheels, and the distribution of torque to the left and right rear wheels 14, 15, which are the auxiliary drive wheels, to 50%:50%.

(c) A lower-limit value of the 4WD instruction torque is set to a magnitude that is necessary for distributing 50% of the creep torque when the vehicle is stopped, and an upper-limit value of the 4WD instruction torque is set to a magnitude that is necessary for avoiding four-wheel brake locking.

The scheme in (a) is to achieve a 4WD instruction torque with which it is possible to attain a clutch control action in the scenario in which the vehicle starts off again in FIG. 14. Specifically, when a transition in the 4WD instruction torque is made progressively from traveling after having remained in the D position to stopping and then to setting off again, it is preferable that the electronic control coupling 10 can maintain the cam torsion state even while the vehicle is stopped. Therefore, provided that the electronic control coupling 10 can maintain the cam torsion state even while the vehicle is stopped, a broad range in a high-torque zone is permitted as a range in which to set the 4WD instruction torque.

The scheme in (b) is to achieve a 4WD instruction torque with which it is possible to reliably attain the clutch control action in the scenario in which the vehicle starts off again in FIG. 14. Specifically, in order to reliably attain the clutch control action in the scenario in which the vehicle starts off again in FIG. 14, it is necessary, e.g., for the electronic control coupling 10 to maintain the cam torsion state even when the vehicle begins to slide while stopped on a slope. However, the maximum torque transmitted to the drive system while the vehicle is stopped is creep torque. Accordingly, equally distributing the creep torque when the vehicle is stopped to all four wheels from among the front and rear wheels brings about an optimal torque distribution mode in which gripping of a road surface by tires on the four wheels is ensured and which suppresses sliding of the vehicle against, inter alia, resistance to a road-surface gradient. Therefore, the range in which to set the 4WD instruction torque is a range obtained by: setting, as a targeted torque value, a magnitude of torque at which the creep torque when the vehicle is stopped is distributed in a 50%:50% ratio; and imparting, to the target torque value, a torque permission width according to, inter alia, error in estimating the creep torque when the vehicle is stopped.

The scheme in (c) is to achieve a 4WD instruction torque with which it is possible to attain the clutch control action in the scenario in which the vehicle starts off again in FIG. 14, and also to avoid four-wheel brake locking when the vehicle starts off again. Specifically, when a high 4WD instruction torque for maintaining a rigid 4WD state is set in relation to the drive torque when the vehicle starts off again, a four-wheel drive system assumes a state of complete direct coupling so that brake torque as well as drive torque is distributed to the four wheels. Therefore, if one of the four tires undergoes brake locking due to, inter alia, bumpiness of a road surface when the vehicle starts off again, the brake torque applied to a tire is distributed to the four wheels, adversely resulting in four-wheel brake locking. Therefore, the lower-limit value of the 4WD instruction torque is set to a torque necessary for distributing 50% of the creep torque when the vehicle is stopped, in the same manner as in the scheme in (b), and the upper-limit value of the 4WD instruction torque is stipulated as a torque at which four-wheel brake locking can be avoided. Therefore, a set range according to the lower-limit value and the upper-limit value is imparted to the 4WD instruction torque.

Figure 15:
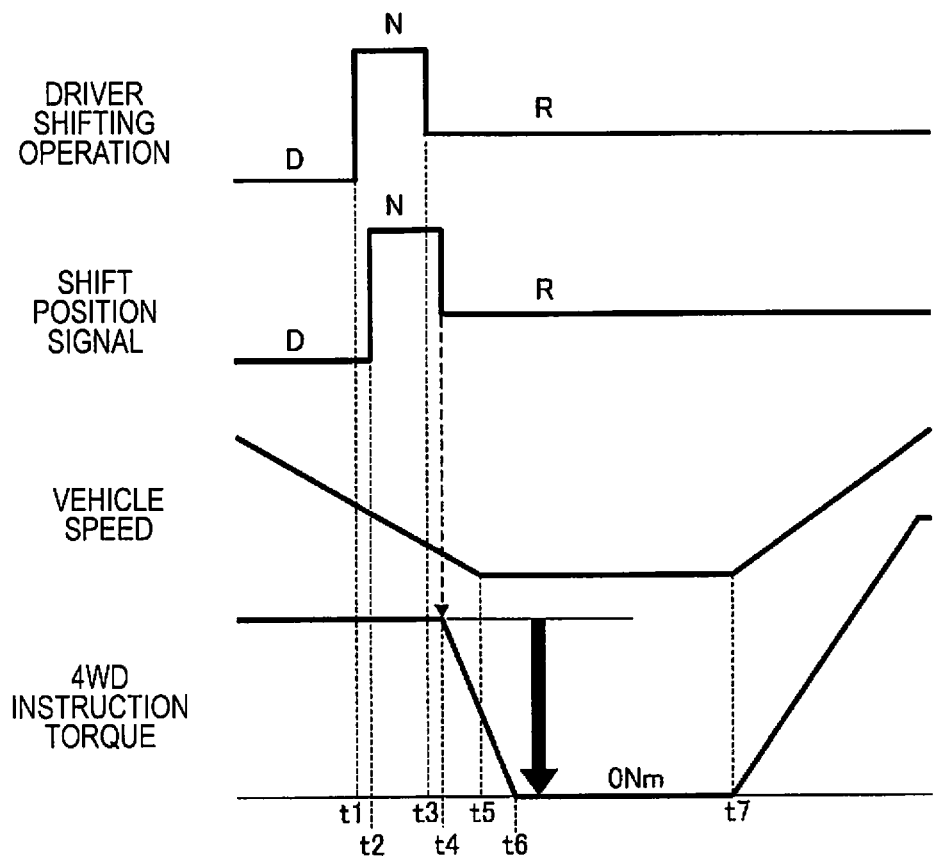
FIG. 15 is a time chart showing various characteristics pertaining to a driver shifting operation, a shift position signal, the vehicle speed, and the 4WD instruction torque at a time when a shift-position-switching operation from D to N and then to R is performed during a changeover from a traveling state to a stopped state in the first embodiment.

Clutch Control Action in Scenario in which Shift Position is Switched and Vehicle is Stopped FIG. 15 is a time chart showing various characteristics at a time when a shift-position-switching operation from D to N and then to R is performed during a changeover from a traveling state to a stopped state in the first embodiment. A clutch control action in a scenario in which the shift position is switched and the vehicle is stopped in the first embodiment is described below on the basis of FIG. 15.

For example, in a scenario in which the shift position is switched from D to N and then to R and the vehicle is stopped, the propeller shaft 9 is placed in a state of torsion toward an advance side while the vehicle is stopped. In this case, the torsion state of the cam mechanism of the electronic control coupling 10 changes over from the state of torsion toward the advance side to a state of torsion toward the reverse side when the vehicle starts off again in reverse. At this time, when the balls 34 provided to the cam mechanism of the electronic control coupling 10 are disengaged from a state of being tightly sandwiched between a pair of opposing cam surfaces of the cam grooves 36, 36 by advance-side torsion, the balls 34 are forcefully propelled by return torsion and are caused to collide with a pair of opposing cam surfaces by the reverse-side torsion. Therefore, collision noise is produced when the balls 34 collide with the reverse-side cam surfaces. This collision noise is abnormal to the driver and/or a passenger.

However, in the first embodiment, in a scenario in which the shift position is switched from D to N and then to R and the vehicle is stopped, a configuration is adopted so that the state of torsion toward the advance side of the propeller shaft 9 while the vehicle is stopped is returned to a disengaged state. Specifically, an operation is performed to switch from the D position to the N position at time t1 and to switch from the N position to the R position at time t3. At this time, a shift position signal from the inhibitor switch 26 switches from a D position signal to an N position signal at time t2, and switches from the N position signal to an R position signal at time t4.

Accordingly, the switching of the signal from the N position signal to the R position signal serves as a trigger, and the 4WD instruction torque from time t4 starts to be reduced toward zero torque (0 Nm) on an abrupt gradient. The vehicle stops at time t5, the 4WD instruction torque reaches zero torque at time t6 immediately after the vehicle stops, and the electronic control coupling 10 changes over from an engaged state to the disengaged state due to the 4WD instruction torque. As a consequence, when stopped at time t6 onward, the vehicle stands by in preparation for an operation to set off again in reverse in a state in which torsion of the propeller shaft 9 is disengaged.

When there is a change in depression from the brake OFF operation to the accelerator ON operation, with the intent being to set off again in reverse, the cam mechanism of the electronic control coupling 10 changes over from the cam free state to a reverse-side cam meshing state due to the state in which the torsion of the propeller shaft 9 is disengaged. The vehicle speed increases at time t7, and the vehicle starts to set off in reverse. Because the torsion of the propeller shaft 9 is configured to be disengaged in advance while the vehicle is stopped, abnormal noise produced by the cam mechanism of the electronic control coupling 10 is prevented during setting off again in reverse.

Figure 16:
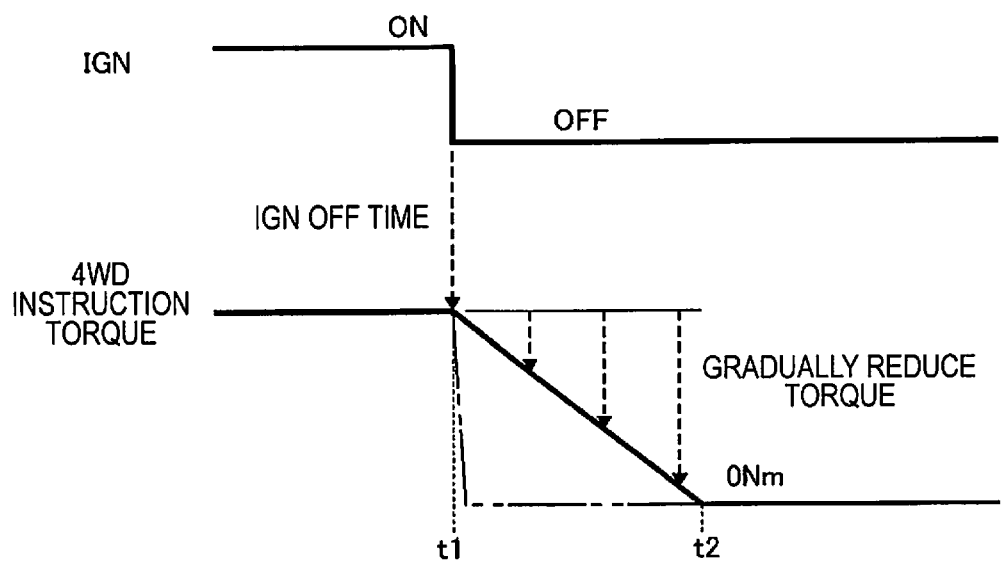
FIG. 16 is a time chart showing various characteristics pertaining to an ignition switch signal and the 4WD instruction torque at a time when an ignition-switch OFF operation is performed in a state in which initial torque is applied in the first embodiment.

Clutch Control Action in Scenario in which Ignition is Turned OFF and Vehicle is Stopped FIG. 16 is a time chart showing various characteristics at a time when an ignition-switch OFF operation is performed in a state in which initial torque is applied in the first embodiment. A clutch control action in a scenario in which the ignition is turned OFF and the vehicle is stopped in the first embodiment is described below on the basis of FIG. 16.

For example, when an ignition-switch OFF operation is performed in a state in which initial torque is applied to an electronic control coupling, the initial torque being applied is abruptly removed in response to the switch OFF operation. In this case, the abrupt removal of the initial torque being applied causes the torque transmitted to the left and right rear wheels to suddenly change, which results in fluctuation of longitudinal G of the vehicle and the occurrence of clutch disengagement shock. In particular, in a case where braking to apply high initial torque while the vehicle is stopped is performed in the same manner as in the first embodiment, a problem is presented in that the clutch disengagement shock occurring increases and a sense of discomfort is imparted to the driver and/or a passenger.

However, in the first embodiment, a configuration is adopted in which the initial torque applied is gently removed when an ignition-switch 25 OFF operation is performed in a state in which initial torque is applied to the electronic control coupling 10. Specifically, when an operation is performed to change the ignition switch 25 from ON to OFF at time t1 when the 4WD instruction torque is outputted and the vehicle is stopped, the switching of an ignition-switch signal serves as a trigger, and the 4WD instruction torque from time t1 starts to be reduced toward zero torque (0 Nm) on a gentle gradient. The 4WD instruction torque reaches zero torque at time t2. Therefore, during the ignition-switch 25 OFF operation, gently removing the initial torque being applied suppresses any change in the torque transmitted to the left and right rear wheels 14, 15 and prevents clutch disengagement shock. The state in which the ignition-switch 25 OFF operation is performed and the vehicle is stopped creates an environment in which the driver and/or passenger is more sensitive to shock than when the vehicle is traveling. Accordingly, preventing clutch disengagement shock when sensitivity to shock is higher thereby results in no sense of discomfort being imparted to the driver and/or passenger.

Effects of the invention are described next. In the clutch control device for a four-wheel-drive engine-powered vehicle of the first embodiment, it is possible to obtain the effects listed below.

(1) Either the left and right front wheels 6, 7 or the left and right rear wheels 14, 15 are configured as main drive wheels connected to a drive source (engine 1), and the other of the left and right front wheels 6, 7 or the left and right rear wheels 14, 15, are configured as auxiliary drive wheels connected via a friction clutch (electronic control coupling 10) to the drive source (engine 1). When the vehicle starts off due to an accelerator depressing operation, the friction clutch (electronic control coupling 10) is engaged, whereby a drive torque from the drive source (engine 1) is distributed to the main drive wheels and the auxiliary drive wheels. In the clutch control method for a four-wheel-drive vehicle (four-wheel-drive engine-powered vehicle), when the vehicle changes over from a traveling state to a stopped state while remaining in a travel shift position (D position, R position), a control is performed to apply initial torque Tr1, Tr2 as an engagement torque control of the friction clutch (electronic control coupling 10) while the vehicle is performed. A magnitude of the initial torque Tr1, Tr2 is set to a magnitude that is necessary for maintaining a drive-system torsion state by torque transmitted to an auxiliary-drive-wheel drive system before the vehicle is stopped (FIG. 11). Therefore, it is possible to provide a method for controlling a clutch of a four-wheel-drive engine-powered vehicle (four-wheel-drive vehicle) in which, when the vehicle starts off again from the stopped state, responsiveness of torque transmission to the auxiliary drive wheels (left and right rear wheels 14, 15) relative to the accelerator depressing operation is ensured.

(2) In instances where creep torque is distributed to the main drive wheels and the auxiliary drive wheels while the vehicle is stopped, the magnitude of the initial torque Tr1, Tr2 is set to a magnitude of torque that is necessary for setting the ratio of the distribution of torque to the main drive wheels and the distribution of torque to the auxiliary drive wheels to 50%:50% (FIG. 14). Therefore, in addition to the effect in (1), it is possible to maintain a drive-system torsion state by torque transmitted to the auxiliary-drive-wheel drive system before the vehicle is stopped by ensuring road-surface grip force by tires on the four wheels when the vehicle is stopped.

(3) The friction clutch is the electronically controlled ball-cam-type coupling 10. When a shift-position-switching operation is performed between an advancing travel shift position (D position) and a reversing travel shift position (R position) while the vehicle is stopped, the initial torque Tr1, Tr2 that had been applied before the shift-position-switching operation is reduced to or below a prescribed value (to zero torque) (FIG. 15). Therefore, in addition to the effects in (1) and (2), when the vehicle starts off again after the shift-position-switching operation, it is possible to prevent abnormal noise produced by a cam mechanism of the electronic control coupling 10 by disengaging torsion of a propeller shaft 9 in advance while the vehicle is stopped.

(4) When an ignition-switch 25 OFF operation is performed while the vehicle is stopped, the initial torque Tr1, Tr2 applied before the OFF operation is gradually reduced to zero torque (FIG. 16). Therefore, in addition to the effects in (1) to (3), when the ignition switch 25 is turned OFF when the vehicle is stopped, it is possible to prevent clutch disengagement shock in the friction clutch (electronic control coupling 10).

(5) Either left and right front wheels 6, 7 or left and right rear wheels 14, 15 are configured as main drive wheels connected to a drive source (engine 1), and the other of the left and right front wheels 6, 7 or the left and right rear wheels 14, 15, are configured as auxiliary drive wheels connected via a friction clutch (electronic control coupling 10) to the drive source (engine 1). The vehicle is provided with a 4WD controller 16 that, when the vehicle starts off due to an accelerator depressing operation, causes the friction clutch (electronic control coupling 10) to be engaged, whereby drive torque from the drive source (engine 1) is distributed to the main drive wheels and the auxiliary drive wheels. In this device for controlling a clutch of a four-wheel-drive vehicle (four-wheel-drive engine-powered vehicle), the 4WD controller 16 has an initial-torque-processing unit 16a that, when the vehicle changes over from a traveling state to a stopped state while remaining in a travel shift position (D position, R position), performs a control to apply initial torque Tr1, Tr2 when the vehicle is stopped as an engagement torque control of the friction clutch (electronic control coupling 10). The initial-torque-processing unit 16a sets a magnitude of the initial torque Tr1, Tr2 to a magnitude that is necessary for maintaining a drive-system torsion state by torque transmitted to an auxiliary-drive-wheel drive system before the vehicle is stopped (FIG. 4). Therefore, it is possible to provide a device for controlling a clutch of a four-wheel-drive engine-powered vehicle (four-wheel-drive vehicle) in which, when the vehicle starts off again from the stopped state, responsiveness of torque transmission to the auxiliary drive wheels (left and right rear wheels 14, 15) relative to the accelerator depressing operation is ensured.

The method and device for controlling a clutch of a four-wheel-drive vehicle according to the present disclosure were described above on the basis of the first embodiment. However, in terms of specific configuration, the method and device are not limited to the first embodiment; various design changes, additions, etc., are allowed provided that these modifications do not depart from the gist of the invention as in the claims.

In the first embodiment, an example of an initial torque control was presented in which: the creep torque when the vehicle is stopped in the D position is determined in advance, and the initial torque Tr1 when the vehicle is stopped in the D position is applied in accordance with the first initial torque map Mp1; and the creep torque when the vehicle is stopped in the R position is also determined in advance, and the initial torque Tr2 when the vehicle is stopped in the R position is applied in accordance with the second initial torque map Mpg. However, the initial torque control is not limited to that in the first embodiment; the present invention also permits an example in which the initial torque Tr1 when the vehicle is stopped in the D position and/or the initial torque Tr2 when the vehicle is stopped in the R position is instead applied in accordance with a computation at each application thereof. When applied in accordance with this computation, the initial torque is computed according to the engine speed and the torque converter performance in the case of a four-wheel-drive engine-powered vehicle. Alternatively, in the case of a four-wheel-drive electric-powered vehicle that has a motor/generator as a drive source, the four-wheel-drive electric-powered vehicle being such that creep torque when the vehicle is stopped is applied in accordance with a creep torque control of the motor/generator, a creep torque value in the creep torque control is used in the computation.

In the first embodiment, an example was presented in which when a shift-position-switching operation is performed between the D position and the R position when the vehicle is stopped, the initial torque Tr1, Tr2 that had been applied before the shift-position-switching operation is reduced to zero torque. However, the present invention also permits an example in which when the shift-position-switching operation is performed, the initial torque that had been applied before the shift-position-switching operation is reduced to or below a prescribed value within a range in which the friction clutch (electronic control coupling 10) can be disengaged.

In the first embodiment, an example was presented in which an electronically controlled ball-cam-type coupling is used as the friction clutch. However, the friction clutch is not limited to that in the first embodiment; the present invention also permits an example in which another type of friction clutch is used, such as a hydraulic multi-plate clutch, etc.

In the first embodiment, an example was presented in which the clutch control method and the clutch control device of the present disclosure are applied to a four-wheel-drive engine-powered vehicle having a front-wheel-drive base, an engine being mounted as a drive source in the four-wheel-drive engine-powered vehicle. However, the clutch control method and the clutch control device of the present disclosure can also be applied to a four-wheel-drive hybrid vehicle in which an engine and a motor/generator are mounted as drive sources, or to a four-wheel-drive electric-powered automobile in which a motor/generator is mounted as a drive source. Furthermore, the four-wheel-drive vehicle is not limited to having a front-wheel-drive base; the present disclosure can also be applied to a four-wheel-drive vehicle having a rear-wheel-drive base.

The invention claimed is:

1. A four-wheel-drive vehicle clutch control method for a four-wheel-drive vehicle in which either left and right front wheels or left and right rear wheels are configured as main drive wheels connected to a drive source, and the other of the left and right front wheels and the left and right rear wheels are configured as auxiliary drive wheels connected via a friction clutch to the drive source, and when the vehicle starts off due to an accelerator depressing operation, the friction clutch is engaged, whereby a drive torque from the drive source is distributed to the main drive wheels and the auxiliary drive wheels, the four-wheel-drive vehicle clutch control method comprising:

when the vehicle changes over from a traveling state to a stopped state while maintaining in a travel shift position, performing a control to apply initial torque as an engagement torque control of the friction clutch when the vehicle is stopped; and setting a magnitude of the initial torque to a magnitude that is necessary for maintaining a drive-system torsion state by transmitting torque to an auxiliary-drive-wheel drive system before the vehicle is stopped.

2. The four-wheel-drive vehicle clutch control method as claimed in claim 1, wherein in instances where a creep torque is distributed to the main drive wheels and the auxiliary drive wheels while the vehicle is stopped, the setting of the magnitude of the initial torque to a magnitude of torque that is necessary for setting a ratio of a distribution of torque to the main drive wheels and a distribution of torque to the auxiliary drive wheels to 50%:50%.

3. The four-wheel-drive vehicle clutch control method as claimed in claim 2, further comprising when a shift-position-switching operation is performed between an advancing travel shift position and a reversing travel shift position while the vehicle is stopped, reducing the initial torque that had been applied before the shift-position-switching operation to or below a prescribed value; and wherein the friction clutch is an electronically controlled ball-cam-type coupling.

4. The four-wheel-drive vehicle clutch control method as claimed in claim 2, further comprising when an ignition-switch OFF operation is performed while the vehicle is stopped, gradually reducing the initial torque that had been applied before the OFF operation to zero torque.

5. The four-wheel-drive vehicle clutch control method as claimed in claim 1, further comprising when a shift-position-switching operation is performed between an advancing travel shift position and a reversing travel shift position while the vehicle is stopped, reducing the initial torque that had been applied before the shift-position-switching operation to or below a prescribed value; and wherein the friction clutch is an electronically controlled ball-cam-type coupling.

6. The four-wheel-drive vehicle clutch control method as claimed in claim 5, further comprising when an ignition-switch OFF operation is performed while the vehicle is stopped, gradually reducing the initial torque that had been applied before the OFF operation to zero torque.

7. The four-wheel-drive vehicle clutch control method as claimed in claim 1, further comprising when an ignition-switch OFF operation is performed while the vehicle is stopped, gradually reducing the initial torque that had been applied before the OFF operation to zero torque.

8. A four-wheel-drive vehicle clutch control device for a four-wheel-drive vehicle in which either left and right front wheels or left and right rear wheels are configured as main drive wheels connected to a drive source, and the other of the left and right front wheels or the left and right rear wheels are configured as auxiliary drive wheels connected via a friction clutch to the drive source, and the four-wheel-drive vehicle clutch control device comprising:

a 4WD controller programmed to engage the friction clutch when the vehicle starts off due to an accelerator depressing operation, whereby drive torque from the drive source is distributed to the main drive wheels and the auxiliary drive wheels, the 4WD controller being further programmed to perform a control to apply an initial torque as an engagement torque control of the friction clutch when the vehicle is stopped after the vehicle has changed over from a traveling state to a stopped state while remaining in a travel shift position; and the 4WD controller being further programmed to set a magnitude of the initial torque to a magnitude that is necessary for maintaining a drive-system torsion state by torque transmitted to an auxiliary-drive-wheel drive system before the vehicle is stopped.

* * * * *